UNITED STATES PATENT OFFICE.

THOMAS J. MAYALL, OF READING, MASSACHUSETTS.

ENAMELING SURFACES WITH RUBBER COMPOUND.

SPECIFICATION forming part of Letters Patent No. 247,839, dated October 4, 1881.

Application filed May 7, 1881. (No model.)

*To all whom it may concern:*

Be it known that I, THOMAS J. MAYALL, of Reading, in the county of Middlesex and State of Massachusetts, have invented a new and useful Improvement in Enamel for the Surface of Wood, Metals, and other Substances, of which the following is a specification.

The object of my invention is to make an enamel on the surface of wood, metals, and other substances which will afford perfect protection against the action of the atmosphere, water, and other fluids, including acids, and at the same time produce ornamental effects when such are desirable.

My invention relates to the compound of materials of which the substance of the enamel is composed, the manner of combining, applying, and affixing the compound to the surface to be enameled; and it consists in combining and blending together pure rubber and either of the sulphides or sulphurets of antimony and applying the compound to the surface to be enameled either in the form of a thin sheet or in a semi-fluid solution of the consistency of thin paste or paint, and then curing (or vulcanizing) the compound, by the action of heat, to the degree of hardness required.

To practice my invention I take of pure rubber one part and of one of the sulphides or sulphurets of antimony from one to three or even four parts, by weight, according to the quality required for the enamel, and thoroughly mix and blend them together by grinding or other suitable means, and then either run the compound out into thin sheets or reduce it to a semi-fluid paste or paint by the addition of a sufficient quantity of naphtha or other suitable solvent of rubber. The semi-fluid paste or paint I apply to the surface to be enameled with a brush, generally putting on several coats of it to get a proper thickness for the enamel; or one coat of the paste or paint may be applied and over that the thin sheet laid on to get the required thickness, as may be found most convenient. When a sufficient thickness of the rubber and the sulphide or sulphuret of antimony compound has been applied, I cure the compound by exposing it to the action of heat, varying, according to circumstances, from about 250° to 325° Fahrenheit, and for a period which may vary, according to the proportions of the materials of the compound or the thickness of the mass to be cured, from about one hour to three or even four hours, until the enamel is cured to the consistency of what is termed "hard rubber."

Where a fine quality of enamel is required I use the rubber and sulphide or sulphuret of antimony in about equal proportions by weight; but very good surfaces can be produced, which will answer for many purposes equally as well as the finest quality, with a much greater proportion of the sulphide or sulphuret of antimony; and the proportion of it may be increased up to three or even four parts of it to one of the rubber.

To produce an enamel having a smooth polished surface when it comes from the heater, cover the compound with tin-foil, smoothly laid on and held by pressure while the curing process continues.

The curing of the rubber and sulphide or sulphuret of antimony compound may be effected in or by any of the methods and means used to cure hard rubber, or in any other practicable method or manner.

To cure the compound on wood it is necessary to protect the wood from overheating and charring, and I do this by the use of a press having both its bed-plate and follower chambered and provided with suitable inlet and outlet passages and stoppers to admit and discharge hot air, steam, or water. In using such a press for curing the enamel compound on wood I admit steam or hot air into the chamber nearest the enamel and a flow of water, preferably cold, into and through the chamber which is nearest the wood surface. The faces of both the bed-plate and follower of such a press may be rendered perfectly smooth by polishing and burnishing, or by covering them with a facing of tin, glass, or other smooth-surfaced substance, so that it may come directly in contact with the enamel compound and produce a polished surface on it when cured without the use of tin-foil. When tin-foil is used it is removed by peeling it off when the curing process is completed.

To apply this enamel to objects of irregular shape and uneven surfaces, I coat the surface uniformly and sufficiently with the compound, and then smoothly overlay the compound coating with tin-foil, pressed on so that no air remains under it. I then place the object in a strong iron box, open on one side, and having a follower to close and enter the opening. I fill the space in the box around the object to be enameled with pulverized talc or other similar powdered substance, and close the follower into the open side of the box with a screw or other suitable appliance until an equal and sufficient pressure is produced on all sides of the inclosed object. The box and contents are then exposed to the action of heat in an oven or otherwise until the enamel compound is sufficiently cured.

This enamel can be applied to any object the substance of which will bear the degree of heat required to cure the enamel compound without injury.

The sulphides of antimony are, by recent improvements in the arts, making them from the raw ores, produced of any color or shade of colors. By the use of these colored sulphides or sulphurets of antimony in the enamel compound I make the enamel of any color, combination of or shade of color or colors, and in imitation of the appearance of ornamental woods, figured and variegated marble, &c.

In the drawings annexed, Figure 1 shows a cross-section and partial perspective of the press described and its chambered bed-plate and follower. Fig. 2 shows the box described, in which objects of irregular shape are placed to have the enamel cured on them, and the follower to close the box.

I claim as new and my invention—

1. The above-described improvement in the art of enameling wood and other substances, consisting of coating the surface to be enameled with the compound of rubber and sulphide or sulphuret of antimony, and then curing the compound by heat to the consistency of hard rubber, substantially as described.

2. The above-described improvement in the art of enameling wood and other substances by covering the surface to be enameled with a coating of rubber and sulphide or sulphuret of antimony compound dissolved in naphtha or other rubber solvent, and curing the compound by heat, substantially as described.

3. The above-described improvement in the method of curing the enamel compound of rubber and sulphide or sulphuret of antimony on the surface of wood, consisting of submitting the coated wood to the action of heat in a press having a bed-plate and follower, both chambered, the chamber next the enamel being heated by steam or hot air and the chamber next the wood cooled by water, substantially as described, and for the purpose specified.

4. The above-described method of producing an enamel of any color, combination of or shade of colors, by the use of colored sulphides or sulphurets of antimony in the enamel compound, substantially as described.

THOS. J. MAYALL.

Witnesses:
CHS. HOUGHTON,
H. KENNEY, Jr.